(12) United States Patent
Anderson et al.

(10) Patent No.: US 7,753,134 B1
(45) Date of Patent: Jul. 13, 2010

(54) COULTER ASSEMBLY

(75) Inventors: Brian Anderson, Yorkville, IL (US); Travis Harnetiaux, Bourbonnais, IL (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 12/533,894

(22) Filed: Jul. 31, 2009

(51) Int. Cl.
*A01B 15/16* (2006.01)

(52) U.S. Cl. ...................... 172/566; 172/610

(58) Field of Classification Search ............... 172/558, 172/559, 566, 610
See application file for complete search history.

(56) References Cited

U.S. PATENT DOCUMENTS

| | | | |
|---|---|---|---|
| 476,435 A * | 6/1892 | Wiard et al. | 172/565 |
| 785,865 A * | 3/1905 | Davis | 172/559 |
| 808,021 A * | 12/1905 | Davis | 172/559 |
| 1,017,109 A | 2/1912 | Rieske | |
| 1,017,318 A * | 2/1912 | Rieske | 172/575 |
| 1,129,869 A * | 3/1915 | Hunter | 172/566 |
| 1,142,185 A | 6/1915 | Lee | |
| 1,160,638 A | 11/1915 | Miller | |
| 1,204,240 A | 11/1916 | Bozard | |
| 1,248,953 A | 12/1917 | Treadwell | |
| 1,545,895 A | 7/1925 | Hamilton | |
| 1,791,462 A | 2/1931 | Bermel | |
| 2,924,189 A * | 2/1960 | McLeod | 111/187 |
| 3,261,411 A | 7/1966 | Youngberg et al. | |
| 3,833,067 A | 9/1974 | Peterson, Jr. et al. | |
| 4,008,770 A | 2/1977 | Boone et al. | |
| 4,206,817 A * | 6/1980 | Bowerman | 172/559 |
| 4,330,041 A | 5/1982 | Ankenman | |
| 4,333,535 A | 6/1982 | Hentrich, Sr. | |
| 4,736,803 A | 4/1988 | Roush | |
| 5,269,380 A * | 12/1993 | Lofquist et al. | 172/558 |
| 5,394,946 A * | 3/1995 | Clifton et al. | 172/139 |
| 6,347,594 B1 * | 2/2002 | Wendling et al. | 111/167 |
| 6,659,193 B1 * | 12/2003 | Best et al. | 172/566 |
| 6,874,584 B2 | 4/2005 | Butterfield et al. | |
| 7,487,732 B2 * | 2/2009 | Johnston et al. | 111/121 |
| 2003/0015328 A1 * | 1/2003 | Prairie et al. | 172/558 |

* cited by examiner

*Primary Examiner*—Robert E Pezzuto
*Assistant Examiner*—Jamie L McGowan
(74) *Attorney, Agent, or Firm*—Rebecca Henkel

(57) ABSTRACT

A coulter assembly is provided that includes a torsion spring configured to maintain a substantially constant contact force between a scraper and a coulter disk sufficient to remove accumulated soil despite wearing of the scraper and/or coulter disk. In an exemplary embodiment, the coulter assembly includes a scraper having a blade and an arm. The blade is disposed adjacent to a soil engaging portion of the coulter disk, and the arm is rotatably coupled to the coulter assembly and extends along a substantially straight path to the blade. A torsion spring is disposed about a rotational axis of the arm and configured to rotationally bias the blade toward the coulter disk by applying a torque between the coulter assembly and the arm. This configuration obviates manual adjustment of the scraper relative to the coulter disk, thereby reducing maintenance costs and operational delays.

20 Claims, 6 Drawing Sheets

COULTER ASSEMBLY

BACKGROUND

The invention relates generally to a coulter assembly, and more specifically, to a spring biased coulter disk scraper.

In agricultural settings, coulters are typically towed behind a work vehicle, such as a tractor, via a mounting bracket secured to a rigid frame of the implement. Coulters are generally configured to excavate a trench into soil, and may assist in delivering a liquid or dry fertilizer into the trench. Specifically, certain coulters include a coulter disk that cuts into the soil as the coulter moves along the terrain. A penetration depth of the coulter disk is generally regulated by a gauge wheel. In a typical configuration, the gauge wheel is positioned adjacent to the coulter disk and rotates across the soil surface. The coulter disk is positioned below the gauge wheel such that the coulter disk penetrates the soil. A vertical offset distance between the coulter disk and the gauge wheel determines the coulter disk penetration depth.

Such coulters often include a scraper disposed adjacent to the coulter disk to remove accumulated soil. In certain configurations, the scraper is positioned along a soil engaging portion of the coulter disk. Such scraper configurations serve to remove soil that may stick to the disk, widen the trench excavated by the coulter disk, and deliver fertilizer to the soil. The scraper is typically rotationally coupled to the same support structure as the coulter disk and adjusted to maintain a sufficient contact force with the coulter disk to facilitate soil removal. However, during coulter operation, both the scraper and coulter disk experience wear, thereby reducing the contact force below a desired level. Therefore, the scraper is periodically readjusted to compensate for the wear. Because of the large number of coulters typically utilized on an implement, the readjustment process can be quite time consuming, and may significantly delay cultivation activities and increase farming costs.

BRIEF DESCRIPTION

The present invention provides a coulter assembly configured to substantially reduce or eliminate adjustment of the scraper relative to the coulter disk by employing a torsion spring configured to apply a torque between the coulter and an arm of the scraper. In an exemplary embodiment, the coulter includes a scraper having a blade and an arm. The blade is disposed adjacent to a soil engaging portion of the coulter disk, and the arm is rotatably coupled to the coulter and extends along a substantially straight path to the blade. A torsion spring is disposed about a rotational axis of the arm and configured to rotationally bias the blade toward the coulter disk by applying a torque between the coulter and the arm. Therefore, this configuration provides a sufficient contact force between the scraper and the coulter disk to facilitate soil removal from the coulter disk despite wear of the scraper and/or coulter disk.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
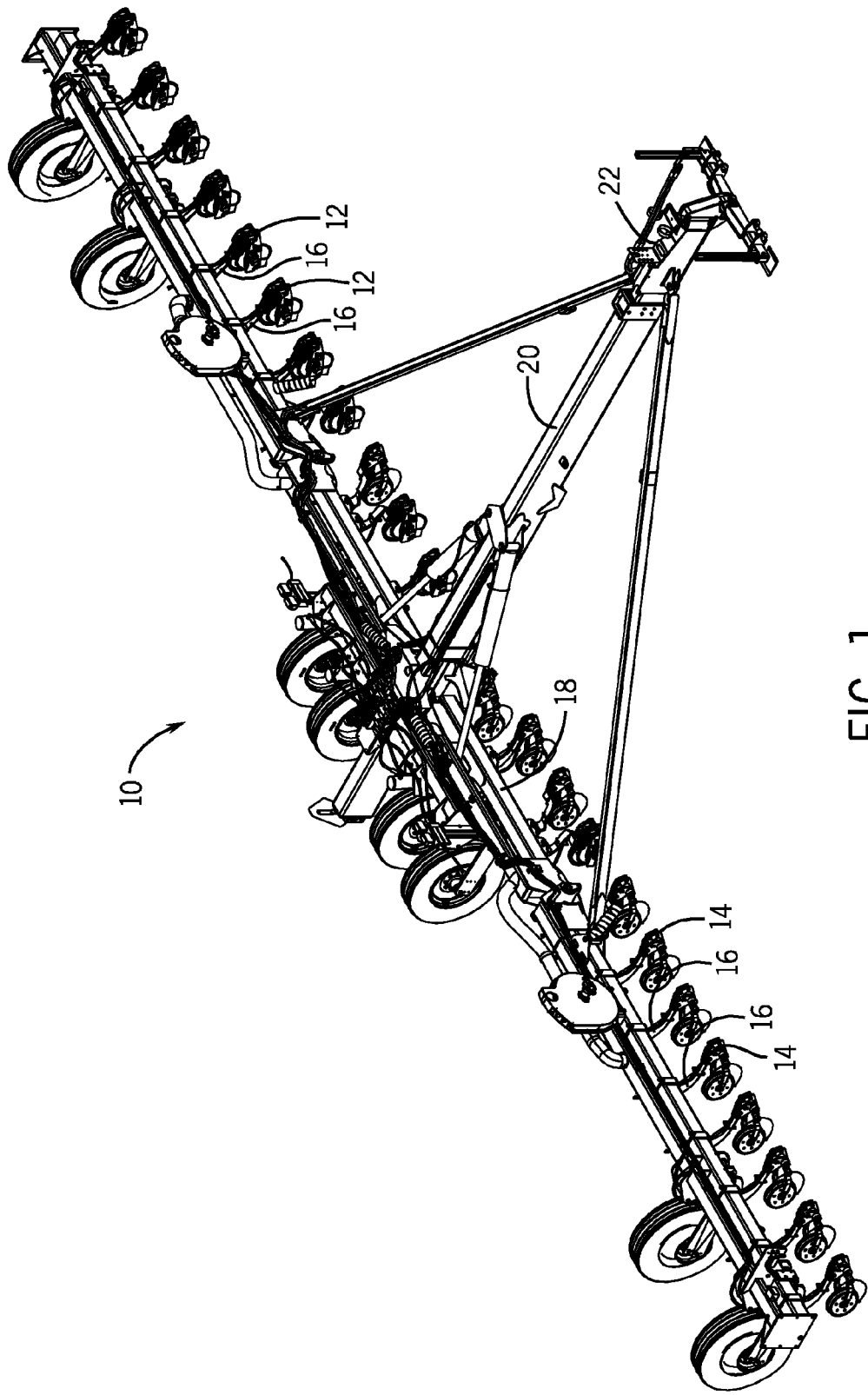
FIG. 1 is a perspective view of a towable agricultural implement including multiple coulter assemblies.

Turning now to the drawings, FIG. 1 is a perspective view of a towable agricultural implement 10 including multiple left-handed coulter assemblies 12 and right-handed coulter assemblies 14. As discussed in detail below, each coulter assembly 12 and 14 includes a coulter disk configured to excavate a trench into soil. A fertilizer delivery assembly positioned behind the coulter disk may then inject a liquid or dry fertilizer into the trench. In such an arrangement, seeds planted adjacent to the trench receive a proper amount of fertilizer following deposition of the fertilizer into the trench opened by each coulter assembly. As illustrated, the coulter assemblies 12 and 14 are secured to shanks 16 that couple the coulter assemblies 12 and 14 to a tool bar 18. In the present embodiment, the tool bar 18 includes 12 left-handed coulter assemblies and 12 right-handed coulter assemblies. Further embodiments may include more or fewer coulter assemblies 12 and 14. For example, certain embodiments may include 2, 4, 6, 8, 10, 14, 16, or more left-handed coulter assemblies 12 and right-handed coulter assemblies 14. The tool bar 18 is coupled to a tow bar 20, including a hitch 22. The hitch 22 may, in turn, be coupled to a tractor such that the towable agricultural implement 10 may be pulled through a field. In certain embodiments, the tool bar 18, including the coulter assemblies 12 and 14, precedes row units configured to deposits seeds into the soil. In such embodiments, the row units may be offset from the coulter assemblies 12 and 14 such that the seeds are deposited a desired distance from the fertilizer enriched trench. This configuration may enable the crops to absorb a proper amount of fertilizer as they grow.

As discussed in detail below, a scraper is disposed adjacent to a soil engaging portion of each coulter disk to remove accumulated soil from the disk. In certain configurations, the scraper is wedge-shaped and serves to both widen the trench formed by the coulter disk and deliver fertilizer to the soil via a fertilizer tube. In such configurations, the scraper is rotationally coupled to the coulter and biased toward the coulter disk. Specifically, the coulter includes a torsion spring that applies a torque between the coulter and an arm of the scraper, thereby providing sufficient contact force between the scraper and the coulter disk to facilitate removal of accumulated soil. Applying torque via the torsion spring ensures that a proper contact force is maintained as the scraper and/or coulter disk wear, thereby substantially reducing or eliminating adjustment of the scraper.

Figure 2:
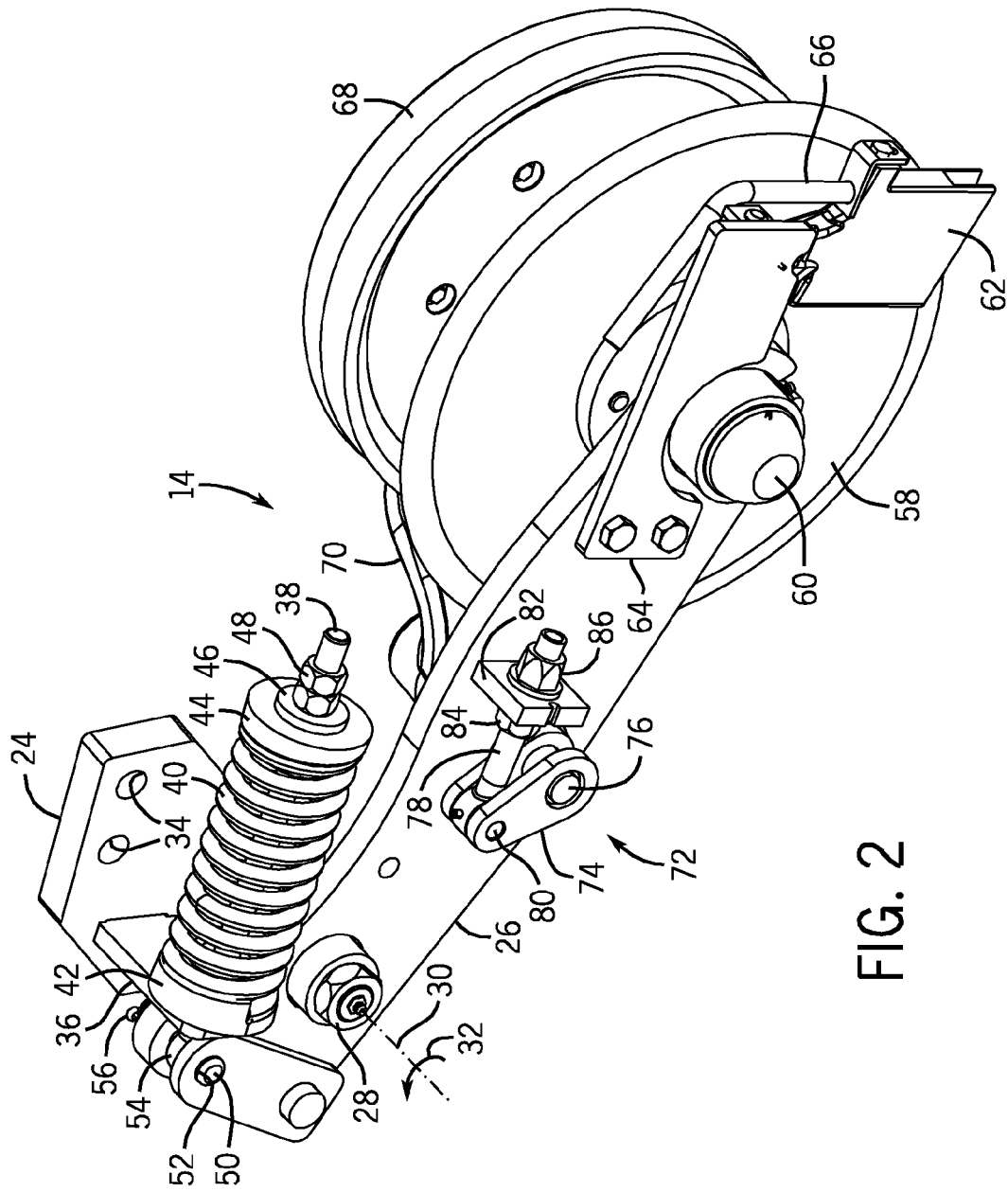
FIG. 2 is a detailed perspective view of one exemplary coulter assembly, as shown in FIG. 1.

FIG. 2 is a detailed perspective view of a right-handed coulter assembly 14. The coulter assembly 14 is coupled to the shank 16 by a tool bar mount 24. As illustrated, the tool bar mount 24 is rotatably coupled to a support structure 26 by a shaft 28. The shaft 28 enables the support structure 26 to rotate about an axis 30 in a direction 32 in response to obstructions or variations in the terrain. Specifically, the tool bar mount 24 is coupled to the shank 16 by fasteners that pass through openings 34 in the tool bar mount 24. The tool bar mount 24 includes a spring plate 36 configured to limit rotation of the support structure 26 with respect to the tool bar mount 24. The coulter assembly 14 includes a threaded rod 38 and a compression spring 40 configured to maintain a substantially constant force between the coulter disk and the soil. Specifically, the threaded rod 38 passes through an opening in the spring plate 36, and the spring 40 is disposed about the threaded rod 38. A first spring stop 42 is disposed between the spring 40 and the spring plate 36, and a second spring stop 44 is disposed adjacent to the opposite end of the spring 40 to ensure that the spring 40 remains disposed about the threaded rod 38. The second spring stop 44 is secured to the spring 40 by a washer 46 and a pair of fasteners 48. The threaded rod 38 is coupled to a pin 50 that passes through a hole 52 in the support structure 26. The pin 50 is secured to the threaded rod 38 by a loop 54 and the support structure 26 by a cotter pin 56.

The arrangement described above enables the support structure 26 to rotate about the axis 30 in the direction 32 in response to variations in field conditions. For example, if the support structure 26 is driven to rotate in the direction 32 by contact with an obstruction, the support structure 26 rotates about the shaft 28. As the support structure 26 rotates, the spring 40 is compressed, thereby biasing the support structure 26 toward its initial orientation. Specifically, rotation of the support structure 26 causes the pin 50 to rotate about the axis 30 in the direction 32. Because the pin 50 is coupled to the threaded rod 38 by the loop 54, the threaded rod 38 is driven to translate through the opening in the spring plate 36. The spring 40 is then compressed between the spring stops 42 and 44 by the washer 46 secured to the threaded rod 38 by the fasteners 48. The spring compression applies a biasing force to the support structure 26 by the previously described linkage, thereby inducing the support structure 26 to return to its initial orientation. Such a configuration may serve to protect the coulter assembly 14 by absorbing the impact of obstructions encountered during cultivation.

The coulter assembly 14 also includes a coulter disk 58 rotatably coupled to the support structure 26 by a bearing assembly 60. The bearing assembly 60 enables the coulter disk 58 to freely rotate as it engages the soil and excavates a trench. The coulter assembly 14 also includes a scraper 62 disposed adjacent to a soil engaging portion of the coulter disk 58. In the present embodiment, the scraper 62 is coupled to the support structure 26 by a bracket 64. In alternative embodiments, the scraper 62 may be coupled directly to the support structure 26. The scraper 62 is configured to remove accumulated soil from the coulter disk 58 and serves to widen the trench. A fertilizer tube 66 is coupled to the scraper 62 and configured to deliver liquid or dry fertilizer into the trench.

As discussed in detail below, the scraper 62 is rotationally biased toward the coulter disk 58 by a torsion spring. Torque provided by the spring establishes a sufficient contact force between the scraper 62 and the coulter disk 58 to remove accumulated soil during operation. Furthermore, as the coulter disk 58 and/or the scraper 62 wears, the torsion spring maintains the contact force, thereby obviating adjustment of the scraper 62. This configuration reduces maintenance costs and operational delays compared to scraper configurations in which the scraper 62 is adjusted manually.

A gauge wheel 68 is pivotally coupled to the support structure 26 by a swing arm 70. The swing arm 70 is, in turn, coupled to a depth adjustment assembly 72 configured to continuously vary the vertical position of the gauge wheel 68 with respect to the support structure 26. Because the gauge wheel 68 travels along the surface of the soil, varying the position of the gauge wheel 68 alters the penetration depth of the coulter disk 58 into the soil. The depth adjustment assembly 72 includes a lever 74 and a shaft 76. The shaft 76 is rigidly coupled to a first end of the lever 74, and a linear actuator is coupled to the second end. In this configuration, extension and retraction of the linear actuator induces the lever 74 and the shaft 76 to rotate. In certain embodiments, the linear actuator may include a pneumatic cylinder, a hydraulic cylinder, or an electromechanical actuator, for example. In the present embodiment, the linear actuator includes a threaded rod 78, a pin 80, a mount 82, a first fastener 84 and a second fastener 86. Adjusting the position of the fasteners 84 and 86 with respect to the rod 78 rotates the lever 74, thereby rotating the shaft 76 coupled to the swing arm 70. Rotating the swing arm 70 alters the vertical position of the gauge wheel 68, thereby varying the penetration depth of the coulter disk 58. Because the fasteners 84 and 86 may be positioned at any location along the length of the rod 78, extension and/or retraction of the rod 78 with respect to the mount 82 may be continuously varied. Therefore, any coulter disk penetration depth within a range defined by the length of the rod 78 and the geometry of the depth adjustment assembly 72 may be achieved.

Figure 3:
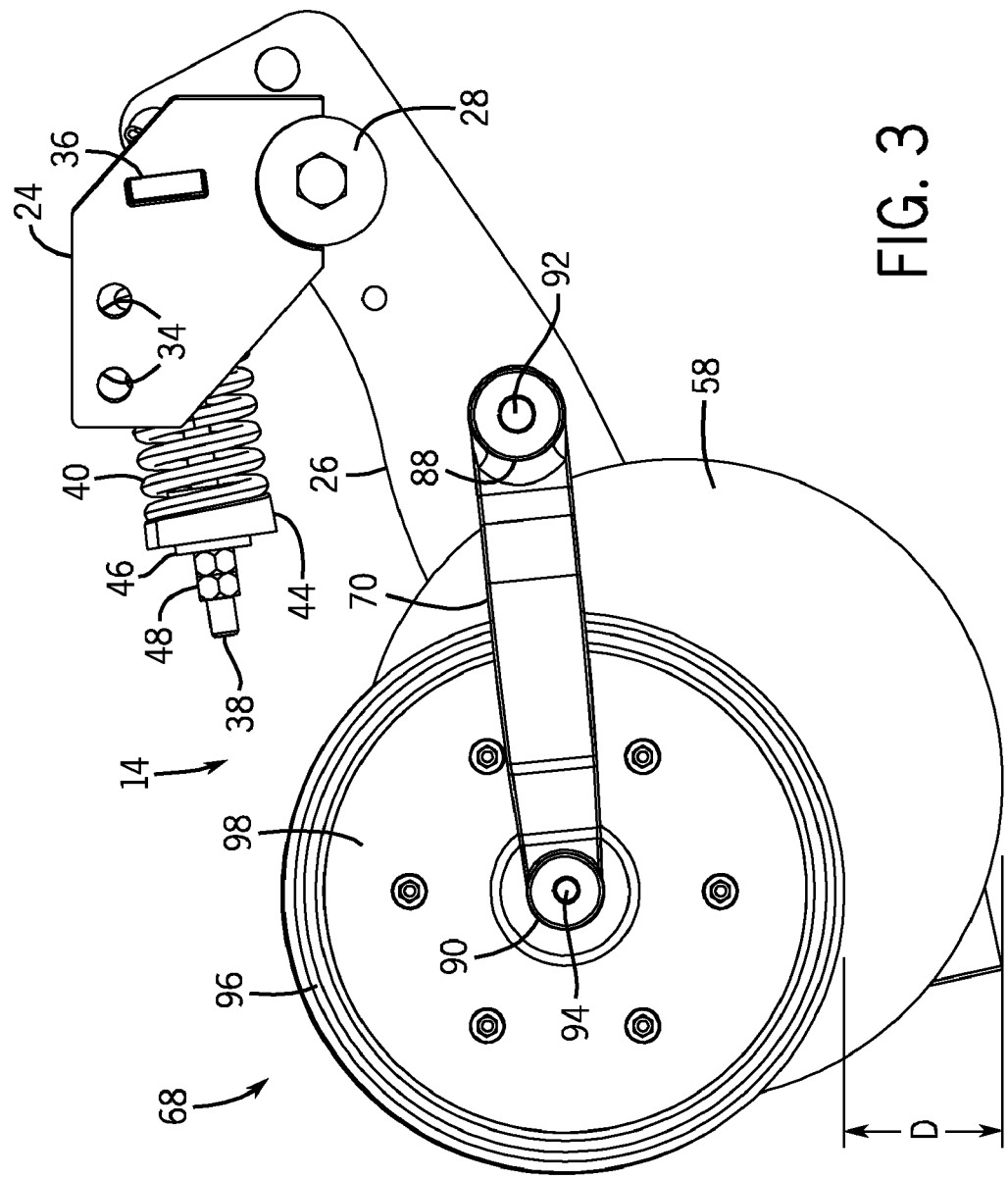
FIG. 3 is a right side view of the coulter assembly of FIG. 2, showing an exemplary arrangement of the support structure, a coulter disk, a gauge wheel, and a swing arm.

FIG. 3 is a right side view of the coulter assembly 14, showing the support structure 26, the coulter disk 58, the gauge wheel 68, and the swing arm 70. As previously discussed, the depth adjustment assembly 72 is configured to rotate the swing arm 70, thereby adjusting the vertical position of the gauge wheel 68. Specifically, the swing arm 70 includes a first region 88 and a second region 90. The first region is rigidly coupled to the shaft 76 by a bolt 92. In this manner, rotation of the shaft 76 induces the swing arm 70 to rotate. In addition, the gauge wheel 68 is rotatably coupled to the second region 90 by a bolt 94. The bolt 94 enables the gauge wheel 68 to rotate as it moves across the soil surface.

In the illustrated embodiment, the gauge wheel 68 includes an outer surface 96 and an inner hub 98. The outer surface 96 may be composed of rubber to provide traction between the gauge wheel 68 and the soil. The inner hub 98 is composed of a rigid material (e.g., nylon) capable of supporting the outer surface 96. As illustrated, a penetration depth D is established between the bottom of the gauge wheel 68 and the bottom of the coulter disk 58. Specifically, because the gauge wheel 68 rotates along the surface of the soil, the coulter disk 58 penetrates the soil to the penetration depth D. In addition, because the depth adjustment assembly 72 is configured to lock the swing arm 70 into place during operation of the coulter assembly 14, the gauge wheel 68 limits the penetration depth D based on the angle of the swing arm 70. Moreover, because the depth adjustment assembly 72 is configured to continuously vary the angle of the swing arm 70 with respect to the support structure 26, the depth adjustment assembly 72 may continuously vary the penetration depth D of the coulter disk 58 into the soil.

In the present embodiment, the gauge wheel 68 is disposed directly adjacent to the coulter disk 58. In this configuration, the gauge wheel 68 serves to remove accumulated soil from one side of the coulter disk 58 as the gauge wheel 68 rotates. In certain embodiments, the gauge wheel 68 is angled about a longitudinal axis of the support structure 26 toward a soil penetrating portion of the coulter disk 58. This arrangement serves to enhance soil removal from the coulter disk 58.

Figure 4:
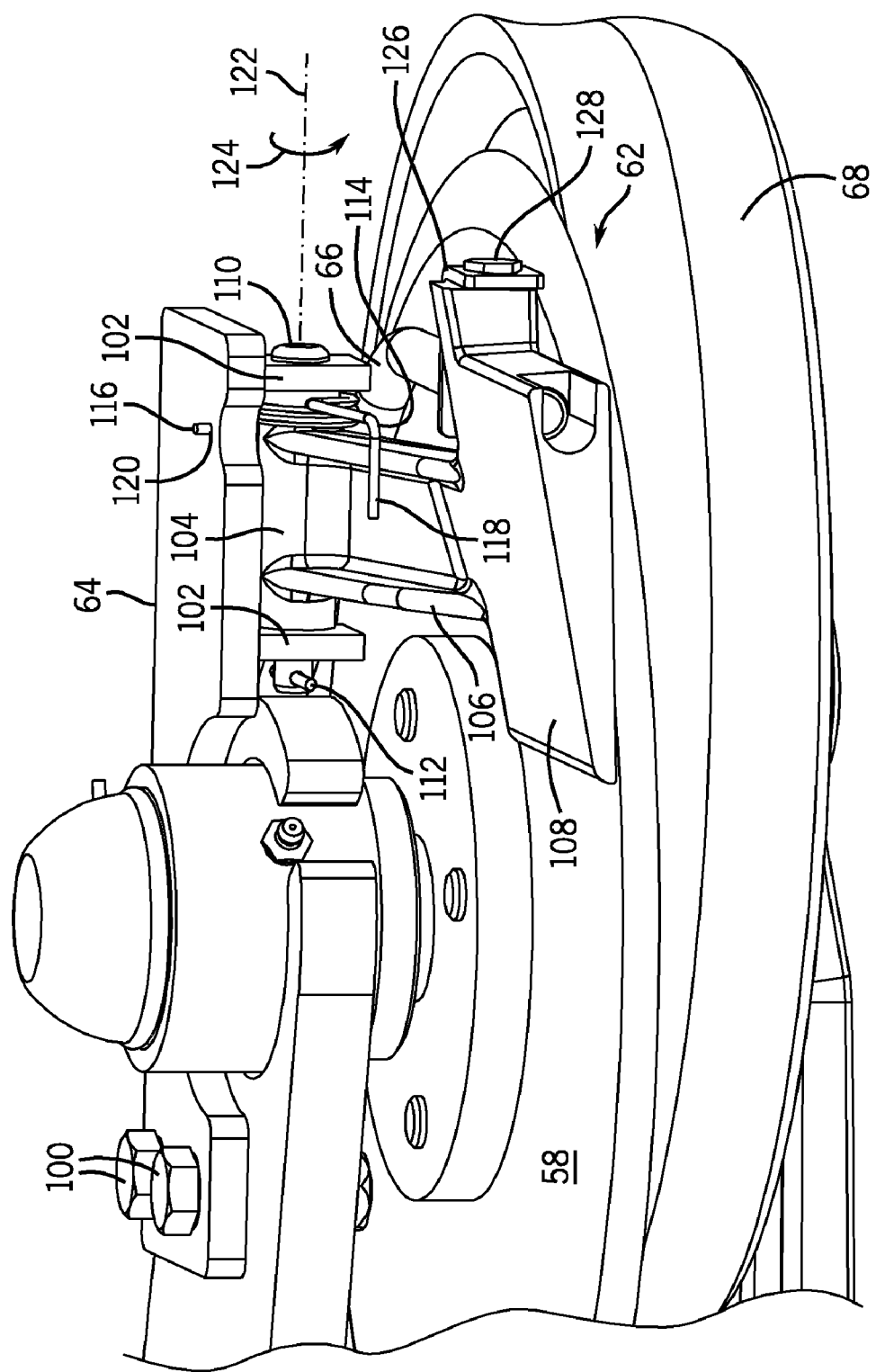
FIG. 4 is a perspective view of the coulter assembly of FIG. 2, showing an exemplary scraper rotationally biased toward the coulter disk by a torsion spring.

FIG. 4 is a perspective view of the coulter assembly 14, showing the scraper 62 rotationally biased toward the coulter disk 58 by a torsion spring. Specifically, the scraper 62 is rotationally coupled to the bracket 64 and disposed adjacent to a soil engaging portion of the coulter disk 58. In alternative embodiments, the scraper 62 may be coupled directly to the support structure 26. In the present embodiment, the bracket 64 is coupled to the support structure 26 by a pair of fasteners 100, such as the illustrated bolts. The fasteners 100 rigidly secure the bracket 64 to the support structure 26 such that a sufficient contact force may be established between the scraper 62 and the coulter disk 58. The bracket 64 also includes a pair of mounts 102 to rotationally couple the scraper 62 to the bracket 64.

The scraper 62 includes a sleeve 104, an arm 106 and a blade 108. The sleeve 104 is sandwiched between the mounts 102, and a fastener 110 extends through openings within the mounts 102 and the sleeve 104, thereby coupling the scraper 62 to the bracket 64. In the present embodiment, the fastener 110 is a pin having a cotter pin 112 disposed within one end to block movement of the pin 110 with respect to the mounts 102. As discussed in detail below, this configuration enables the scraper 62 to rotate about the fastener 110. The arm 106 includes a first end coupled to the sleeve 104, and a second end coupled to the blade 108. As illustrated, the arm 106 is substantially straight, i.e., the arm 106 extends along a substantially straight path between the sleeve 104 and the blade 108.

A torsion spring 114 is disposed about the sleeve 104 and configured to rotationally bias the scraper 62 toward the soil engaging portion of the coulter disk 58. Specifically, the torsion spring 114 includes a first end 116 and a second end 118. The first end 116 is disposed within an opening 120 of the bracket 64. In alternative embodiments, the first end 116 of the spring 114 may be disposed within a notch or recess of the bracket 64. The second end 118 is disposed against the arm 106 of the scraper 62. In the illustrated embodiment, the second end 118 engages the arm 106 substantially perpendicularly to a longitudinal axis of the arm 106. In other words, the second end 118 of the spring 114 forms a substantially right angle with the arm 106. In alternative embodiments, the second end 118 may engage the arm 106 by other means, such as a notch, recess or opening within the arm 106.

In the illustrated configuration, the torsion spring 114 applies a torque between the bracket 64 and the arm 106 to bias the scraper 62 toward the coulter disk 58. Specifically, the torsion spring 114 urges the scraper 62 to rotate about an axis 122 that extends through the fastener 110 and the scraper sleeve 104. Tension within the spring 114 induces the scraper 62 to rotate about the axis 122 in a direction 124. The spring 114 is configured to apply a sufficient torque to the scraper 62 to enable the blade 108 to effectively remove accumulated soil from the coulter disk 58. Furthermore, because the spring 114 applies a substantially constant torque, readjustment operations due to scraper and/or coulter disk wear are substantially reduced or eliminated.

Furthermore, as illustrated, the fertilizer tube 66 is disposed within the blade 108 of the scraper 62. The tube 66 is secured to the blade 108 by a bracket 126 and a fastener 128. As previously discussed, this configuration facilitates injection of fertilizer into the soil as the coulter disk 58 excavates a trench and the wedge-shaped scraper 62 widens the trench.

Figure 5:
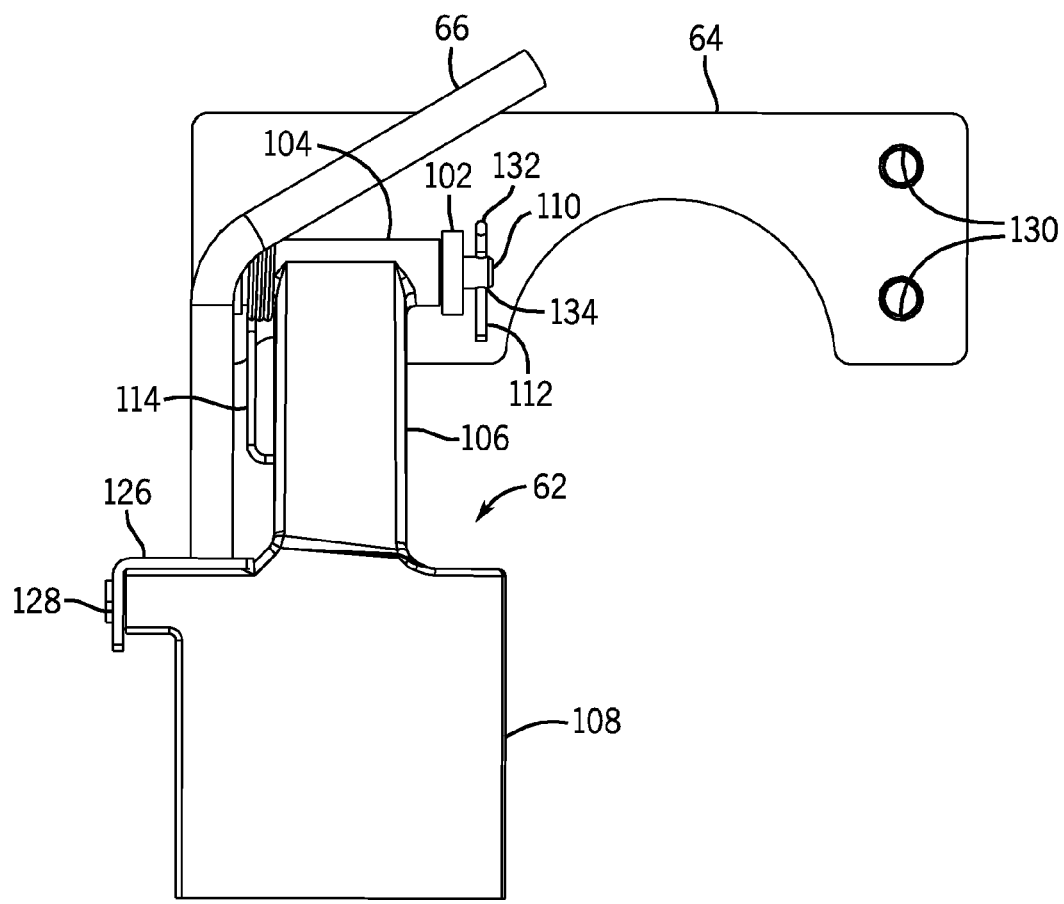
FIG. 5 is a right side view of the scraper of FIG. 4, showing the rotational coupling between the scraper and a bracket.

FIG. 5 is a right side view of the scraper 62, showing the rotational coupling between the scraper 62 and the bracket 64. The bracket 64 includes two openings 130 configured to receive the fasteners 100 that secure the bracket 64 to the support structure 26. In the present embodiment, bolts pass through the openings 130 and corresponding openings within the support structure 26. Nuts are then secured to the bolts to rigidly couple the bracket 64 to the support structure 26. In this manner, the bracket 64 will serve as an effective attachment point for the scraper 62, thereby facilitating a sufficient contact force between the scraper blade 108 and the coulter disk 58 to remove accumulated soil from the disk 58. Furthermore, this configuration enables the bracket 64 to be easily removed from the support structure 26. For example, one wrench may be placed on a head of the bolt, while another wrench is placed on the respective nut. Rotation of one wrench with respect to the other will facilitate removal of the bolts, thereby separating the bracket 64 from the support structure 26. In this manner, the scraper 62 and/or the spring 114 may be maintained without extensive disassembly of the coulter assembly 14.

As previously discussed, the bracket 64 includes mounts 102 configured to support the scraper 62. In the present embodiment, a pin 110 passes through openings within the mounts 102 and the scraper sleeve 104. This configuration enables the scraper 62 to rotate with respect to the bracket 64. The pin 110 is secured to the bracket 64 by the cotter pin 112, including a head 132. Specifically, the cotter pin 112 passes through an opening 134 at one end of the pin 110. As discussed below, a head is disposed on the opposite end of the pin 110. Therefore, movement of the pin 110 is blocked by contact between the head, the cotter pin 112, and the mounts 102. The cotter pin 112 includes arms that may be bent outward to secure the cotter pin 112 to the pin 110. Alternative embodiments may employ other fasteners for rotationally coupling the scraper 62 to the bracket 64. For example, the pin 110 and cotter pin 112 may be replaced by a threaded bolt and nut configuration.

Furthermore, FIG. 5 illustrates another perspective of the torsion spring 114. In the present embodiment, the torsion spring 114 is disposed about the sleeve 104. The spring 114 serves to rotationally bias the scraper blade 108 toward the coulter disk 58 by applying a torque between the bracket 64 and the arm 106. In alternative embodiments, the scraper 62 may be mounted directly to the support structure 26. In such embodiments, the torsion spring 114 applies a torque between the support structure 26 and the scraper arm 106. In addition, FIG. 5 further illustrates the substantially straight arm 106, extending along a substantially straight path between the sleeve 104 and the blade 108. This configuration provides a substantially constant contact force between the scraper blade 108 and the coulter disk 58 despite wearing of the blade 108 and/or the disk 58, thereby obviating adjustment of the scraper 62.

Figure 6:
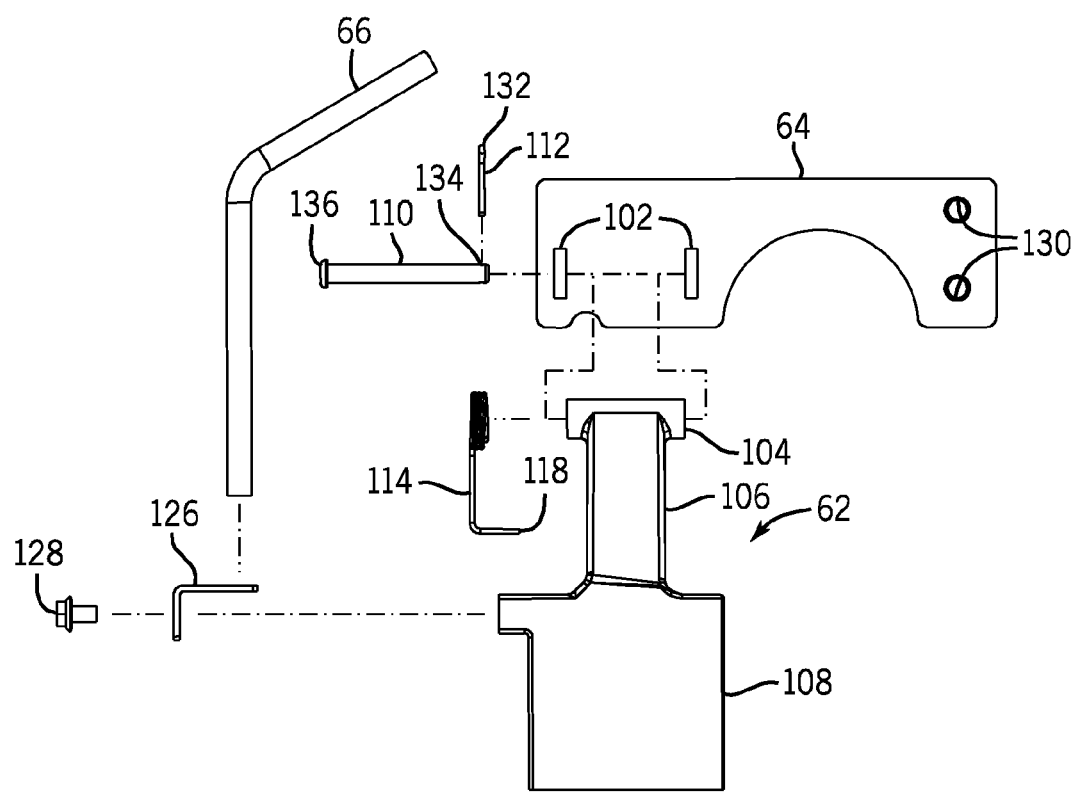
FIG. 6 is an exploded view of the scraper and bracket assembly of FIG. 5, showing the elements of the assembly.

FIG. 6 is an exploded view of the scraper/bracket assembly of FIG. 5, showing the elements of the assembly. In the present embodiment, the assembly is constructed by first disposing the torsion spring 114 about the scraper sleeve 104. The second end 118 of the spring 114 is disposed against the scraper arm 106 at a substantially right angle on a side of the arm 106 opposite from the coulter disk 58. Once assembled, this configuration enables the spring 114 to apply a torque to the scraper 62, thereby establishing a contact force between the scraper blade 108 and the coulter disk 58. The scraper sleeve 104 is then disposed between the mounts 102 such that an opening within the sleeve 104 aligns with an opening in each mount. In addition, the first end 116 of the spring 114 is placed within the opening 120 of the bracket 64.

The pin 110 is then inserted through the mounts 102 and the sleeve 104. As previously discussed, the pin 110 provides a rotational axis for the scraper 62. The pin 110 is secured between the mounts 102 by a head 136 on a first end of the pin 110, and the cotter pin 112 inserted through the opening 134 at a second end of the pin 110. The fertilizer tube 66 is then inserted within an opening of the scraper blade 108 and secured by the bracket 126 and fastener 128. Placing the fertilizer tube 66 within the blade 108 enables fertilizer to be delivered within the trench excavated by the coulter disk 58.

The illustrated configuration facilitates rapid removal and maintenance/replacement of any part without specialized tools or complex procedures.

It should be noted that the foregoing structure is much more readily assembled and disassembled than previously known coulter scraper arrangements. That is, the entire assembly may be installed and then "cocked" by rotation of the torsion spring against its rotational direction of bias. For servicing, the pin 112 may be removed from pin 110, and the entire assembly becomes accessible and removable.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A coulter assembly, comprising:
a support structure;
a coulter disk rotatably coupled to the support structure and configured to engage soil;
a scraper including a blade and an arm, wherein the blade is disposed adjacent to a soil engaging portion of the coulter disk, and the arm is rotatably coupled to the support structure and extends along a substantially straight path to the blade;
a fertilizer tube coupled to said scraper; wherein said fertilizer tube delivers fertilizer into soil; and
a torsion spring disposed about a rotational axis of the arm and configured to rotationally bias the blade toward the coulter disk by applying a torque between the support structure and the arm; said torsion spring disposed about a scraper sleeve; a second end of the torsion spring disposed against the arm at substantially a right angle on a side of the arm opposite from the coulter disk; said scraper sleeve disposed between two mounts and an opening in said sleeve aligns with an opening in each mount; a first end of said spring placed within an opening of a bracket; a pin inserted through the two mounts and the sleeve; wherein said pin provides a rotational axis for the scraper; wherein the blade is rotationally biased toward the coulter disk by applying torque between the support structure and the arm.

2. The coulter assembly of claim 1, wherein the torsion spring comprises a first end and a second end, the first end being disposed within an opening of the support structure and the second end being disposed against the arm.

3. The coulter assembly of claim 2, wherein the second end is oriented substantially perpendicularly to a longitudinal axis of the arm.

4. The coulter assembly of claim 1, wherein the support structure includes two mounts configured to support the arm.

5. The coulter assembly of claim 4, comprising a pin disposed within the arm at the rotational axis, and disposed within the two mounts to rotationally couple the scraper to the support structure.

6. The coulter assembly of claim 1, comprising a gauge wheel rotatably coupled to the support structure and configured to rotate across a surface of the soil to limit a penetration depth of the coulter disk into the soil.

7. A coulter assembly, comprising:
a support structure;
a coulter disk rotatably mounted to the support structure and configured to cut a trench into soil;
a bracket rigidly mounted to the support structure;
a scraper rotatably coupled to the bracket by a fastener and configured to remove accumulated soil from the coulter disk, wherein the scraper includes a substantially straight arm extending from the fastener to a blade disposed adjacent to the coulter disk and configured to engage soil;
a fertilizer tube coupled to said scraper; wherein said fertilizer tube delivers fertilizer into soil; and
a torsion spring disposed about a rotational axis of the scraper and configured to apply a torque between the bracket and the scraper arm; said torsion spring disposed about a scraper sleeve; a second end of the torsion spring disposed against the arm at substantially a right angle on a side of the arm opposite from the coulter disk; said scraper sleeve disposed between two mounts and an opening in said sleeve aligns with an opening in each mount; a first end of said spring placed within an opening of the bracket; a pin inserted through the two mounts and the sleeve; wherein said pin provides a rotational axis for the scraper; wherein the blade is rotationally biased toward the coulter disk by applying torque between the support structure and the arm.

8. The coulter assembly of claim 7, wherein the torsion spring comprises a first end and a second end, the first end being disposed within an opening in the bracket.

9. The coulter assembly of claim 8, wherein the second end is disposed against the scraper arm.

10. The coulter assembly of claim 9, wherein the second end contacts the scraper arm at a substantially right angle relative to a longitudinal axis of the arm.

11. The coulter assembly of claim 7, wherein the fastener comprises a pin disposed within two mounts coupled to the bracket.

12. The coulter assembly of claim 11, wherein the pin is secured to the two mounts by a head disposed on a first end on the pin, and a cotter pin disposed within a second end of the pin.

13. The coulter assembly of claim 7, comprising a gauge wheel movably coupled to the support structure and configured to rotate across a surface of the soil to limit a penetration depth of the coulter disk into the soil.

14. The coulter assembly of claim 13, comprising a depth adjustment assembly coupled to the gauge wheel and configured to adjust the penetration depth of the coulter disk by continuously varying a position of the gauge wheel relative to the support structure.

15. A coulter assembly, comprising:
a support structure;
a coulter disk rotatably mounted to the support structure and configured to cut a trench into soil;
a scraper sleeve disposed about a fastener coupled to the support structure to facilitate rotation of the sleeve relative to the support structure;
a substantially straight scraper arm having a first end and a second end, the first end being coupled to the scraper sleeve;
a scraper blade disposed adjacent to a soil engaging portion of the coulter disk and coupled to the second end of the scraper arm;
a fertilizer tube coupled to said scraper; wherein said fertilizer tube delivers fertilizer into soil; and
a torsion spring disposed about the scraper sleeve and configured to apply a torque between the support structure and the scraper arm; said torsion spring disposed about the scraper sleeve; a second end of the torsion spring disposed against the arm at substantially a right angle on a side of the arm opposite from the coulter disk; said scraper sleeve disposed between two mounts and an opening in said sleeve aligns with an opening in each mount; a first end of said spring placed within an opening of a bracket; a pin inserted through the two mounts and the sleeve; wherein said pin provides a rotational axis for the scraper; wherein the blade is rotationally biased toward the coulter disk by applying torque between the support structure and the arm.

16. The coulter assembly of claim 15, wherein the fastener comprises a pin secured to the support structure by two mounts disposed on opposite sides of the scraper sleeve.

17. The coulter assembly of claim 15, wherein the torsion spring comprises a first end and a second end, the first end being disposed within an opening in the support structure and the second end being disposed adjacent to the scraper arm.

18. The coulter assembly of claim 15, comprising a gauge wheel rotatably coupled to the support structure and configured to rotate across a surface of the soil to limit a penetration depth of the coulter disk into the soil.

19. The coulter assembly of claim 18, comprising a compression spring disposed between the support structure and a tool bar mount, and configured to maintain a substantially constant force between the gauge wheel and the soil.

20. The coulter assembly of claim 15, comprising a fertilizer tube disposed within the scraper blade and configured to deliver fertilizer into the soil.

* * * * *